United States Patent

Archey et al.

[11] Patent Number: 5,986,019
[45] Date of Patent: Nov. 16, 1999

[54] PROCESS FOR PREPARING A COPOLYCARBONATE

[75] Inventors: Rick L. Archey, Pleasant Hills; James P. Mason, McKees Rocks; Leslie J. Vescio, Ambridge, all of Pa.

[73] Assignee: Bayer Corporation, Pittsburgh, Pa.

[21] Appl. No.: 08/926,271

[22] Filed: Sep. 5, 1997

[51] Int. Cl.$^6$ .................. C08G 81/00; C08G 77/448; C08G 64/18
[52] U.S. Cl. .................. 525/464; 525/413; 525/450
[58] Field of Search .................. 525/413, 450, 525/464

[56] References Cited

U.S. PATENT DOCUMENTS

| | | | |
|---|---|---|---|
| 3,189,662 | 6/1965 | Vaughn, Jr. | 260/824 |
| 3,419,634 | 12/1968 | Vaughn, Jr. | 260/824 |
| 4,123,588 | 10/1978 | Molari, Jr. | 428/412 |
| 4,569,970 | 2/1986 | Paul et al. | 525/67 |
| 4,657,989 | 4/1987 | Evans | 525/464 |
| 4,920,183 | 4/1990 | Evans et al. | 525/464 |
| 4,994,532 | 2/1991 | Hawkins et al. | 525/464 |
| 5,068,302 | 11/1991 | Horlacher et al. | 528/21 |
| 5,414,054 | 5/1995 | Jonsson et al. | 525/439 |

*Primary Examiner*—Patricia A. Short
*Attorney, Agent, or Firm*—Joseph C. Gil; Aron Preis

[57] ABSTRACT

A process for making a copolymeric resin is disclosed. Accordingly, component (a) and component (b) are introduced into an extruder under conditions designed to promote reactive blending therebetween in the presence of a transesterification catalyst. Component (a) is a wet aromatic polycarbonate resin containing moisture in an amount greater than 0.02 weight percent and having units conforming to

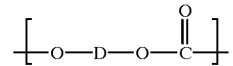

wherein D is a divalent residue of a dihydroxy compound. Component (b) is a lactone-siloxane block copolymer having structural units conforming to

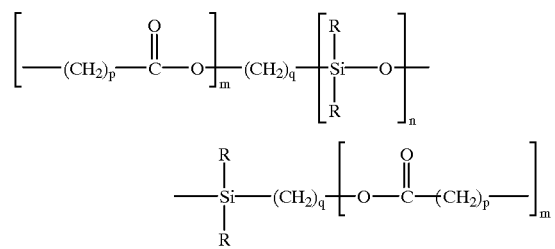

wherein m is 1–90, n is 60–150, R is an alkyl or a phenyl radical, p is 2–12 and q is 2–20. Surprisingly, use of moisture-containing polycarbonate in the process yields a copolymer having good properties, although a corresponding process where the lactone-siloxane block copolymer reactant has a smaller number of repeating units yields inferior product.

10 Claims, No Drawings

PROCESS FOR PREPARING A COPOLYCARBONATE

FIELD OF THE INVENTION

The invention concerns a process for preparing a thermoplastic molding composition and more particularly a reactive blending process entailing a polycarbonate and caprolactone-co-siloxane.

SUMMARY OF THE INVENTION

A process for making a copolymeric resin is disclosed. Accordingly, component (a) and component (b) are introduced into an extruder under conditions designed to promote reactive blending therebetween in the presence of a transesterification catalyst. Component (a) is a wet aromatic polycarbonate resin containing moisture in an amount greater than 0.02 weight percent and having units conforming to

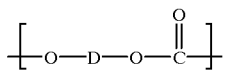

wherein D is a divalent residue of a dihydroxy compound. Component (b) is a lactone-siloxane block copolymer having structural units conforming to

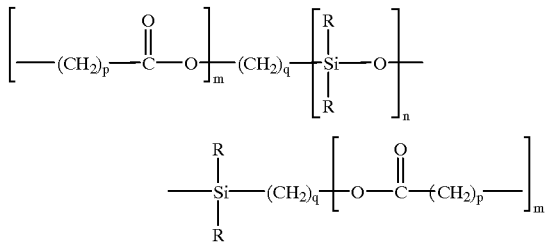

wherein m is 1–90, n is 60–150, R is an alkyl or a phenyl radical, p is 2–12 and q is 2–20. Surprisingly, use of moisture-containing polycarbonate in the process yields a copolymer having good properties although a corresponding process where the lactone-siloxane block copolymer reactant has a smaller number of repeating units yields inferior product.

BACKGROUND OF THE INVENTION

Polycarbonate resins are well-known thermoplastic resins which have long been used in a variety of applications requiring resistance to impact. At low temperatures, generally lower than 20° C., polycarbonate becomes brittle and its utility is thus limited by this shortcoming. It is known that the low temperature impact strength of polycarbonate may be improved upon by the introduction (by copolymerization) of silicone blocks into the carbonate structure. U.S. Pat. Nos. 3,189,662; 3,419,634; 4,123,588; 4,569,970; 4,920,183 and 5,068,302 are noted to disclose relevant copolymers.

Relevant copolymers have been prepared in accordance with a melt blending process disclosed in U.S. Pat. No. 4,994,532. The process entails melt blending an aromatic polycarbonate resin and a polydiorganosiloxane having at least one functional carboxylic acid group. Also relevant in the present context is U.S. Pat. No. 4,657,989 which disclosed a preparation method where siloxane compound is reacted with polycarbonate, wherein at least one of the reactants is anionic and the other being reactive with nucleophiles.

Most relevant is the disclosure in U.S. Pat. No. 5,414,054 which disclosed reactive blending of polycarbonate with a lactone siloxane copolymer in the presence of a catalyst. The resulting compositions exhibit improved low-temperature impact strength.

DETAILED DESCRIPTION OF THE INVENTION

The inventive catalytic process for making a copolymeric resin comprises introducing component (a) and component (b) into an extruder under conditions designed to promote reactive blending therebetween in the presence of a transesterification catalyst. Accordingly, component (a) is a wet aromatic polycarbonate resin containing moisture in an amount greater than 0.02, preferably 0.03 to about 0.35 percent relative to its weight and having units conforming to

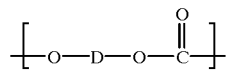

wherein D is a divalent residue of a dihydroxy compound. Component (b) is a lactone-siloxane block copolymer having structural units conforming to

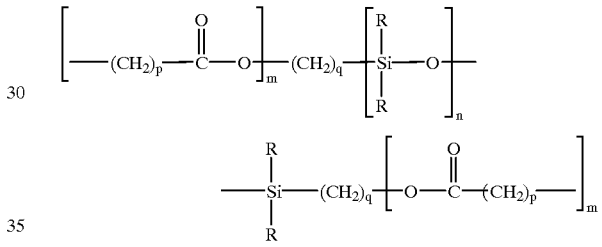

wherein m is 1–90, n is 60–150, R is an alkyl or a phenyl radical, p is 2–12 and q is 2–20.

The term "reactive blending" as used in the present context refers to a homogeneous admixing of the polycarbonate resin and the lactone-siloxane block copolymer in the molten state, that is in the state where these resins are in a thermoplastic state (heated to a condition of plasticity whereupon the resins flow like a fluid). Typically, the temperature is within a range to cause reaction between the resins, generally in the range of 200 to 350° C., preferably 250 to 320° C.

Suitable polycarbonate resins for preparing the copolymer of the present invention are homopolycarbonates and copolycarbonates and mixtures thereof.

The polycarbonates generally have a weight average molecular weight of 10,000–200,000, preferably 20,000–80,000 and their melt flow rate, per ASTM D-1238 at 300° C., is about 1 to about 65 g/10 min., preferably about 2–15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

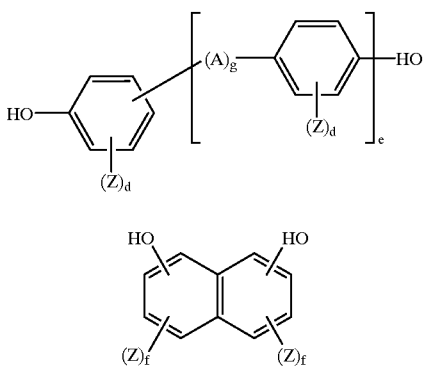

(1)

(2)

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —$SO_2$— or a radical conforming to

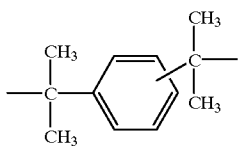

e and g both denote the number 0 to 1;

Z denotes F, Cl, Br or $C_1$–$C_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,3,5-trimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compounds.

Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991, 273.

The preferred process for the preparation of polycarbonates is the interfacial polycondensation process.

Other methods of synthesis in forming the polycarbonates of the invention such as disclosed in U.S. Pat. No. 3,912, 688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 g/10 min., respectively. These are products of Bayer Corporation of Pittsburgh, Pa.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

Most importantly in the context of the present invention, the polycarbonate which is introduced into the reactive blending process contains a relatively high moisture content and is not dried prior to the introduction into the extruder. While typically, polycarbonate for reactive blending is introduced into the extruder in a dry state, the polycarbonate used in the inventive process contains more than 0.02%, preferably 0.03 to about 0.35 percent of water, the percents being relative to the weight of the polycarbonate.

The lactone-siloxane block copolymer suitable in the present context is preferably a block copolymer having a structure conforming to

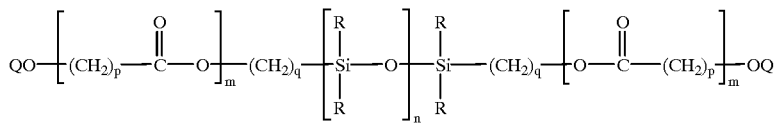

where
- m is 1–90, preferably 1–50, n is 60–150, preferably 60–100,
- R denotes a substituted or an unsubstituted $C_1$–$C_{20}$-alkyl or a phenyl radical, preferably methyl,
- Q denotes H, $C_1$–$C_4$ alkyl or a substituted alkyl group, a hydrocyclic or substituted hydrocyclic group, an aromatic or substituted aromatic group, a benzylic or substituted benzylic group or a silyl or substituted silyl group,
- p is 2 to 12, preferably 2, 4 or 5, and
- q is 2–20, preferably 6–10.

In preparing the copolymer of the present invention, it is important that the length of the lactone block should be kept at a minimum, however, too short a length gives rise to incompatibility between the lactone-siloxane polymer and the polycarbonate resin which in turn gives rise to an excessively slow rate of reaction. While the slow reaction rate may be reconciled by increasing the amount of catalyst, this in turn has an adverse effect on the properties of the final product. Best results were obtained in instances where the dimethyl siloxane block length is of about 60 to 80 repeating units and each caprolactone block has about 5 to 15 repeating units.

A most preferred lactone siloxane block copolymer is Tegomer H-Si 6720, a product of Goldschmidt, having a PDMS block length of about 70 repeat units and PCL block length of about 10 repeat units.

In preparing the copolymer of the invention, it is important that the amount of siloxane in the final product will be about 1 to 20%, preferably 2 to 10% and most preferably about 3 to 6% relative to the weight of the copolymer.

In the process of the invention, the amount of catalyst used in the course of the melt blending is about 5 to 1000 ppm, preferably 25 to 500 ppm and most preferably 50 to 200 ppm, based on the weight of the resulting copolymer.

Suitable catalysts are the known transesterification catalysts which are stable at temperatures above 200° C., including the titanium, tin, zinc, antimony and lead compounds which are known in the art for their catalytic effect. Special mention would be made of titanium (IV) butoxide, tetrakis (2-ethylhexyl)titanate, tin(IV) oxide, dibutyl tin oxide, dioctyltin oxide, dibutyl tin dilaurate, dioctyltin dilaurate, butyltin hydroxide oxide, octyltin hydroxide, zinc(IV) oxide, zinc (II) oxide, lead phenolate and lead acetate.

Forming the composition of the invention may be accomplished by any conventional melt blending technique, including a thermoplastic extruder, preferably a twin screw extruder, where the reactants are heated to a melt temperature and thoroughly mixed in the presence of a catalyst to effect a reaction.

In carrying out the preparation of the copolymer of the invention, the polycarbonate is introduced into an extruder, preferably, a twin screw extruder, and the lactone-siloxane copolymer is either mixed with the resins and introduced via the feeder or melted and pumped with a suitable pump, preferably a gear pump, to a down stream addition port of the extruder. The catalyst may be added either (i) together with the polycarbonate resins in the feeder or (ii) dispersed into the melted lactone-siloxane copolymer and pumped into the extruder or (iii) dissolved in a suitable solvent, for instance, methylene chloride, chloroform and tetrachloroethane, mixed with the lactone-siloxane copolymer and then pumped into the extruder. The extrusion and pelletizing are carried out following known methods; a vacuum of about 20–25 inches of water was applied during the extrusion step. The extrusion process parameters, measured on a ZSK-30 twin screw extruder, are normally as follows: melt temperature 200–350° C., preferably 250–320° C., screw speed 100–700 rpm, preferably 200–600 rpm, most preferably 300–500 rpm.

Experimental:

In a series of runs, 94 percent by weight of moisture-containing polycarbonate resin and 6 percent of the polycaprolactone-siloxane of the invention, were reactively blended in an extruder (melt temperature of about 315° C., screw speed 300 rpm) in the presence of (150 ppm) dibutyltin dilaurate catalyst. The polycarbonate was Makrolon 3200 homopolycarbonate based on bisphenol-A, a product of Bayer Corporation, (melt flow rate (@300° C., 1.2 kg Load of about 5 g/10 min. per ASTM D 1238); the polycaprolactone-siloxane was Tegomer H-Si 6720 from Goldschmidt.

The extruded copolymer was examined as to its properties and the results are summarized in Table 1.

TABLE 1

|  | 1 | 2 | 3 | 4 |
|---|---|---|---|---|
| moisture content[(i)], % | 0.0858 | 0.3687 | 0.0875 | 0.0870 |
| tensile properties: |  |  |  |  |
| yield strength, kpsi | 7.92 | 7.96 | 7.96 | 7.94 |
| elongation @ break, % | 132 | 113 | 123 | 127 |
| Impact properties: |  |  |  |  |
| ¼" notched Izod @ 73° F. ft.lb/in | 12.4 | 12.4 | 12.9 | 12.7 |

[(i)]moisture content in the polycarbonate

The extrudates showed no delamination and exhibited good quality of surfaces.

In a corresponding set of experiments, the copolymers prepared in accordance with the invention were compared to corresponding extrudates where the polycaprolactone-siloxane was Tegomer H-Si 6520 (from Goldschmidt) which is outside the scope of the invention. In this series, the polycarbonate and the polycaprolactone-siloxane in accordance with the invention as well as the relative amounts of the reactants and catalyst were identical to those of the experiments described above. A summary of the results is shown in Table 2.

TABLE 2

|  | 5(a) | 6(a) | 7(a) | 8 | 9 |
|---|---|---|---|---|---|
| moisture content[(i)], % | 0.02 | 0.1135 | 0.3495 | 0.1135 | 0.3495 |
| tensile properties: |  |  |  |  |  |
| yield strength, kpsi | 8.43 | 2.41 | 2.59 | 7.67 | 7.81 |
| elongation @ break, % | 121 | 0.8 | 1.3 | 85.5 | 61.5 |
| Impact properties: |  |  |  |  |  |
| ¼" notched Izod @ 73 F. ft.lb/in | 11.1 | 10.5 | 10.9 | 9.3 | 9.3 |

(a) comparative examples entailing as polycaprolactone-siloxane Tegomer H-Si 6520.
[(i)] moisture content in the polycarbonate The surface appearance of Examples 8 and 9, representative of the invention was good and the extruded copolymer showed no delamination. The surface appearance of comparative Example 5 (having low moisture content) was good and was free from delamination. Examples 6 and 7 exhibited poor surfaces and were de-laminated.

The dependence of the properties of the inventive copolymer on the relative amounts of polycaprolactone-siloxane is shown in Table 3. The preparation of the copolymer followed the procedure described above. Dibutyltin dilaurate catalyst (150 ppm) was used in the reactions. The polycarbonate used in this series was DP9-9350 copolycarbonate (based on 35 mole percent 2,2-bis-(3,3,5-trimethyl4-hydroxyphenyl)-propane and 65 mole percent BPA). The moisture content of the polycarbonate was 0.1%.

TABLE 3

| Polycarbonate, wt. % | 90 | 92 | 94 | 100 |
|---|---|---|---|---|
| polycaprolactone-siloxane, wt. % | 10 | 8 | 6 | 0 |
| tensile properties: |  |  |  |  |
| yield strength, kpsi | 8.30 | 8.67 | 9.02 | 9.60 |
| elongation @ break, % | 52.6 | 8.2 | 32.2 | 80 |
| Impact properties: |  |  |  |  |
| ¼" notched Izod @ 73° F. ft.lb/in | 8.2 | 7.9 | 2.1 | 1.0 |

The extrudates exhibited good surfaces and no delaminations.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for making a copolymeric resin comprising introducing component (a) and component (b) into an extruder under conditions designed to promote reactive blending therebetween in the presence of a transesterification catalyst, where said component (a) is a wet aromatic polycarbonate resin containing moisture in an amount greater than 0.02 percent relative to its weight and having units conforming to

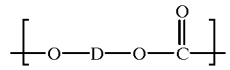

wherein D is a divalent residue of a dihydroxy compound, and where said component (b) is a lactone-siloxane block copolymer having structural units conforming to

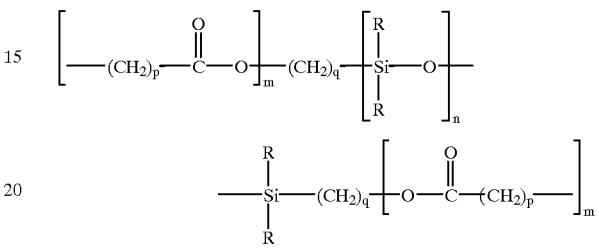

wherein m is 1–90, n is 60–150, R is an alkyl or a phenyl radical, p is 2–12 and q is 2–20.

2. The process of claim 1 wherein moisture is in an amount of 0.03 to about 0.35 percent.

3. The process of claim 1 wherein said n is about 60–100.

4. The process of claim 1 wherein said n is about 60–80.

5. The process of claim 1 wherein said R is a methyl group.

6. The process of claim 1 wherein said p is 2, 4 or 5.

7. The process of claim 1 wherein said q is 6 to 10.

8. The process of claim 1 wherein said n is about 65–100, R is a methyl group, p is 2, 4, or 5 and q is 6 to 10.

9. The process of claim 1 wherein said D is a residue of a dihydroxy compound selected from compounds conforming to formulae (1) or (2);

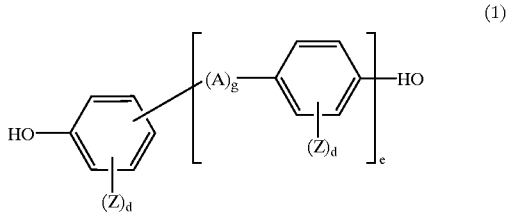

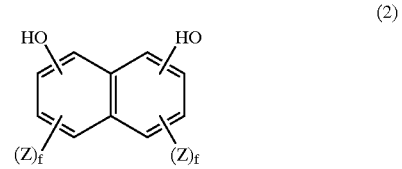

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

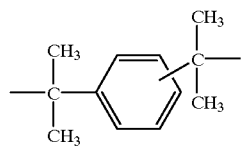

e and g both denote the number 0 to 1;

Z denotes F, Cl, Br or $C_1$–$C_4$-alkyl and if several Z radicals are substituents in one aryl radical, they may be identical or different from one another;

d denotes an integer of from 0 to 4; and f denotes an integer of from 0 to 3.

10. The process of claim 1 wherein said catalyst is a member selected from the group consisting of titanium (IV) butoxide, tetrakis(2-ethylhexyl)titanate, tin(IV) oxide, dibutyl tin oxide, dioctyltin oxide, dibutyl tin dilaurate, dioctyltin dilaurate, butyltin hydroxide oxide, octyltin hydroxide, zinc (IV) oxide, zinc (II) oxide, lead phenolate and lead acetate.

* * * * *